United States Patent
Une et al.

(10) Patent No.: US 11,158,058 B2
(45) Date of Patent: Oct. 26, 2021

(54) INFORMATION PROCESSING APPARATUS AND NON-TRANSITORY COMPUTER READABLE MEDIUM FOR PROCESSING IMAGES OF PUNCHED HOLES

(71) Applicant: FUJIFILM BUSINESS INNOVATION CORP., Tokyo (JP)

(72) Inventors: Kiyoshi Une, Kanagawa (JP); Seiji Shiraki, Kanagawa (JP); Nagamasa Misu, Kanagawa (JP); Ryosuke Tsuji, Kanagawa (JP); Yushiro Tanaka, Kanagawa (JP)

(73) Assignee: FUJIFILM Business Innovation Corp., Tokyo (JP)

(*) Notice: Subject to any disclaimer, the term of this patent is extended or adjusted under 35 U.S.C. 154(b) by 0 days.

(21) Appl. No.: 16/750,575

(22) Filed: Jan. 23, 2020

(65) Prior Publication Data
US 2021/0042934 A1 Feb. 11, 2021

(30) Foreign Application Priority Data
Aug. 9, 2019 (JP) .............................. JP2019-147999

(51) Int. Cl.
*G06T 5/00* (2006.01)
*G06T 7/13* (2017.01)
*G06K 9/46* (2006.01)

(52) U.S. Cl.
CPC .............. *G06T 7/13* (2017.01); *G06K 9/4609* (2013.01); *G06T 5/005* (2013.01); *G06T 2207/10008* (2013.01); *G06T 2207/30176* (2013.01)

(58) Field of Classification Search
None
See application file for complete search history.

(56) References Cited

U.S. PATENT DOCUMENTS

| 5,850,478 A | * | 12/1998 | Suzuki | H04N 1/38 382/204 |
| 8,494,304 B2 | * | 7/2013 | Venable | H04N 1/38 382/275 |
| 8,824,822 B2 | * | 9/2014 | Lei | H04N 1/38 382/254 |
| 9,928,417 B2 | * | 3/2018 | Motoyama | G06T 7/90 |

(Continued)

FOREIGN PATENT DOCUMENTS

JP 4606203 B2 1/2011

*Primary Examiner* — Dung D Tran
(74) *Attorney, Agent, or Firm* — Oliff PLC

(57) ABSTRACT

An information processing apparatus includes a detector, a receiver, and an image processor. The detector is configured to detect a punch hole candidate partial image having a punch hole accuracy indicating whether the punch hole candidate partial image is a punch hole image is less than a first threshold value and equal to or greater than a second threshold value smaller than the first threshold value, from plural partial images constituting a read image of a document. The receiver is configured to display the punch hole candidate partial image, and receive an instruction from a user as to whether to perform image processing on the punch hole candidate partial image. The image processor is configured to perform the image processing on the punch hole candidate partial image when the receiver receives an instruction to perform the image processing on the punch hole candidate partial image.

14 Claims, 16 Drawing Sheets

(56) References Cited

U.S. PATENT DOCUMENTS

| | | | | |
|---|---|---|---|---|
| 9,977,984 | B2* | 5/2018 | Motoyama | G06T 5/005 |
| 9,978,123 | B2* | 5/2018 | Yoshida | H04N 1/38 |
| 10,430,963 | B2* | 10/2019 | Yoshizaki | G06T 5/005 |
| 2008/0279474 | A1* | 11/2008 | Venable | G06T 5/005 |
| | | | | 382/275 |
| 2010/0027076 | A1* | 2/2010 | Wilsher | G06T 5/005 |
| | | | | 358/3.26 |
| 2013/0229695 | A1* | 9/2013 | Lei | H04N 1/38 |
| | | | | 358/448 |
| 2015/0343824 | A1* | 12/2015 | Nishijima | B41M 5/34 |
| | | | | 347/179 |
| 2015/0381851 | A1* | 12/2015 | Takemura | H04N 1/3872 |
| | | | | 358/1.18 |
| 2016/0136989 | A1* | 5/2016 | Nishijima | B41M 5/34 |
| | | | | 347/179 |
| 2016/0292503 | A1* | 10/2016 | Motoyama | G06T 7/73 |
| 2016/0292532 | A1* | 10/2016 | Yoshida | G06K 9/00442 |
| 2018/0240248 | A1* | 8/2018 | Yoshizaki | G06T 7/73 |

\* cited by examiner

| TYPE OF DOCUMENT | FIRST THRESHOLD VALU TH1 | SECOND THRESHOLD VALUE TH2 |
|---|---|---|
| STANDARD | 90% | 48% |
| NON-STANDARD | 75% | 40% |

INFORMATION PROCESSING APPARATUS AND NON-TRANSITORY COMPUTER READABLE MEDIUM FOR PROCESSING IMAGES OF PUNCHED HOLES

CROSS-REFERENCE TO RELATED APPLICATION(S)

This application is based on and claims priority under 35 USC 119 from Japanese Patent Application No. 2019-147999 filed on Aug. 9, 2019.

BACKGROUND

(i) Technical Field

The present disclosure relates to an information processing apparatus and a non-transitory computer readable medium.

(ii) Related Art

Japanese Patent No. 4606203 discloses an image processing apparatus including an image reading unit that reads image information of a document, an image storage unit, a binarization unit that binarizes a read image read by the image reading unit and generates a working image, a low-pass filter unit that scans the working image and changes black pixels to white pixels when the number of continuous black pixels is equal to or less than a threshold value, a feature amount detection unit that detects at least the region and the perimeter of a batch of image regions as a feature amount of a continuous batch of image regions in the working image processed by the low-pass filter unit, a document hole detection unit determining that the batch of image regions is an image of a hole when the perimeter of the batch of image regions detected by the feature amount detection unit is within a first predetermined upper and lower limit range, the area of the batch of image regions is within a second predetermined upper and lower limit range, and a circularity calculated based on the perimeter of the batch of image regions and the area of the batch of image regions is equal to or greater than a circularity threshold value, a hole image creation unit that erases images other than the hole image detected by the document hole detection unit from the working image processed by the low-pass filter unit, and a hole erasure unit that erases a hole portion of the image read by the image reading unit based on the image created by the hole image creation unit.

SUMMARY

When an image of a document having punched holes is read by scanning or copying, the image caused by punch holes such as shadows of the punch holes and the image on the back of the document reflected through the punch holes are included in the read image.

In the related art, when removing an image caused by punch holes from a read image of a document, image processing is performed to determine a threshold value for a feature of an image caused by the punch holes, detect an image caused by the punch holes whose feature is equal to or greater than the threshold value, and remove the detected image.

Aspects of non-limiting embodiments of the present disclosure relate to an information processing apparatus and a non-transitory computer readable medium that reduces at least one of (i) non-detection, that is, an image is recognized as a non-punch hole image even though the image is a punch hole image and image processing that removes the image and that is unique to punch hole images is not performed or (ii) erroneous detection, that is, an image is recognized as a punch hole image even though the image is not the punch hole image and the unique processing of removing the image is performed, as compared with a case where image processing of removing an image having a punch hole accuracy equal to or larger than a first threshold is performed and the image processing is performed for an image having a punch hole accuracy less than the first threshold.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus includes a detector, a receiver, and an image processor. The detector is configured to detect a punch hole candidate partial image having a punch hole accuracy indicating whether the punch hole candidate partial image is a punch hole image is less than a first threshold value and equal to or greater than a second threshold value smaller than the first threshold value, from plural partial images constituting a read image of a document. The receiver is configured to display the punch hole candidate partial image, and receive an instruction from a user as to whether to perform image processing on the punch hole candidate partial image. The image processor is configured to perform the image processing on the punch hole candidate partial image when the receiver receives an instruction to perform the image processing on the punch hole candidate partial image.

BRIEF DESCRIPTION OF THE DRAWINGS

Exemplary embodiments of the present disclosure will be described in detail based on the following figures, wherein.

DETAILED DESCRIPTION

First Exemplary Embodiment

An information processing apparatus according to an exemplary embodiment of the present disclosure will be described below.

<Configuration of First Exemplary Embodiment>

Figure 1:
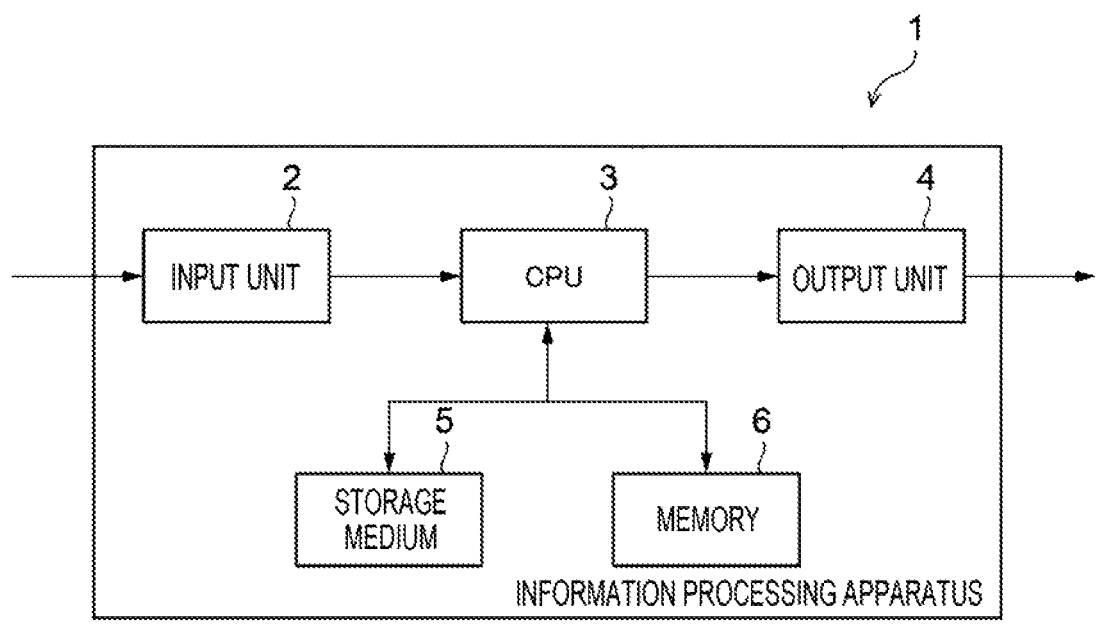
FIG. 1 illustrates a configuration of an information processing apparatus according to an exemplary embodiment.

FIG. 1 illustrates a configuration of the information processing apparatus according to the exemplary embodiment. The information processing apparatus according to the exemplary embodiment will be described below with reference to FIG. 1.

The information processing apparatus 1 according to the exemplary embodiment first obtains plural "extracted partial images TB" (for example, illustrated in FIG. 11) from "read images YG" (for example, illustrated in FIGS. 4A to 4E), which are images read by the function of a scanner and printed on A4 paper, B5 paper, or the like. Next, the information processing apparatus 1 performs first image processing on the "punch hole partial images PB" (for example, illustrated in FIG. 11) including "punch hole images PG" (for example, illustrated in FIG. 4A) that are punch hole images among the plural "extracted partial images TB". The information processing apparatus 1 also performs second image processing on "processing required partial images YB" (for example, illustrated in FIG. 21A) that are selected from "punch hole candidate partial images PKB" (for example, illustrated in FIG. 11) including "pseudo punch hole images GPG" (for example, illustrated in FIGS. 4B to 4E) that are images similar to punch holes. Further, the information processing apparatus 1 does not perform any processing on "non-punch hole partial images HPB" (illustrated in FIG. 11) including "non-punch hole images HPG" (for example, illustrated in FIG. 11) that are images that are not punch holes.

In order to perform the above-described operation, the information processing apparatus 1 includes an input unit 2, a central processing unit (CPU) 3, an output unit 4, a storage medium 5, and a memory 6, as illustrated in FIG. 1. The input unit 2 is implemented by, for example, a keyboard and a mouse. The CPU 3 is an example of a processor and is the well-known core of a computer that operates hardware according to software. The output unit 4 is implemented by, for example, a touch panel type liquid crystal monitor having an input function. The storage medium 5 is implemented by, for example, a hard disk drive (HDD), a solid state drive (SSD), and a read only memory (ROM). The memory 6 is implemented by, for example, a dynamic random access memory (DRAM) and a static random access memory (SRAM).

Figure 2:
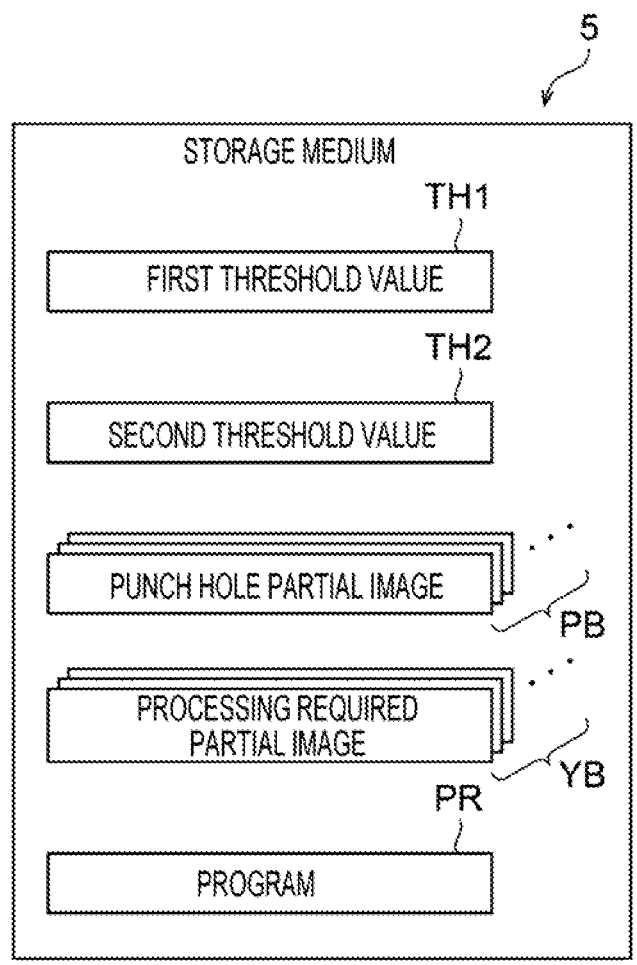
FIG. 2 illustrates objects to be stored in a storage medium according to the exemplary embodiment.

FIG. 2 illustrates objects to be stored in the storage medium according to the exemplary embodiment. As illustrated in FIG. 2, the storage medium 5 stores a first threshold value TH1, a second threshold value TH2, plural punch hole partial images PB, plural processing required partial images YB, and a program PR.

The first threshold value TH1 and the second threshold value TH2 are used to classify (detect) the plural extracted partial images TB into punch hole partial images PB, punch hole candidate partial images PKB, and non-punch hole partial images HPB.

In the process of advancing the above classification, the punch hole partial images PB and the processing required partial images YB are sequentially stored in the storage medium 5. Here, the processing required partial images YB refer to punch hole candidate partial images PKB that are selected by the user of the information processing apparatus 1 as it is considered to require the second image processing.

The contents of the process to be executed by the CPU 3 are defined in advance in the program PR stored in the storage medium 5.

Figure 3:
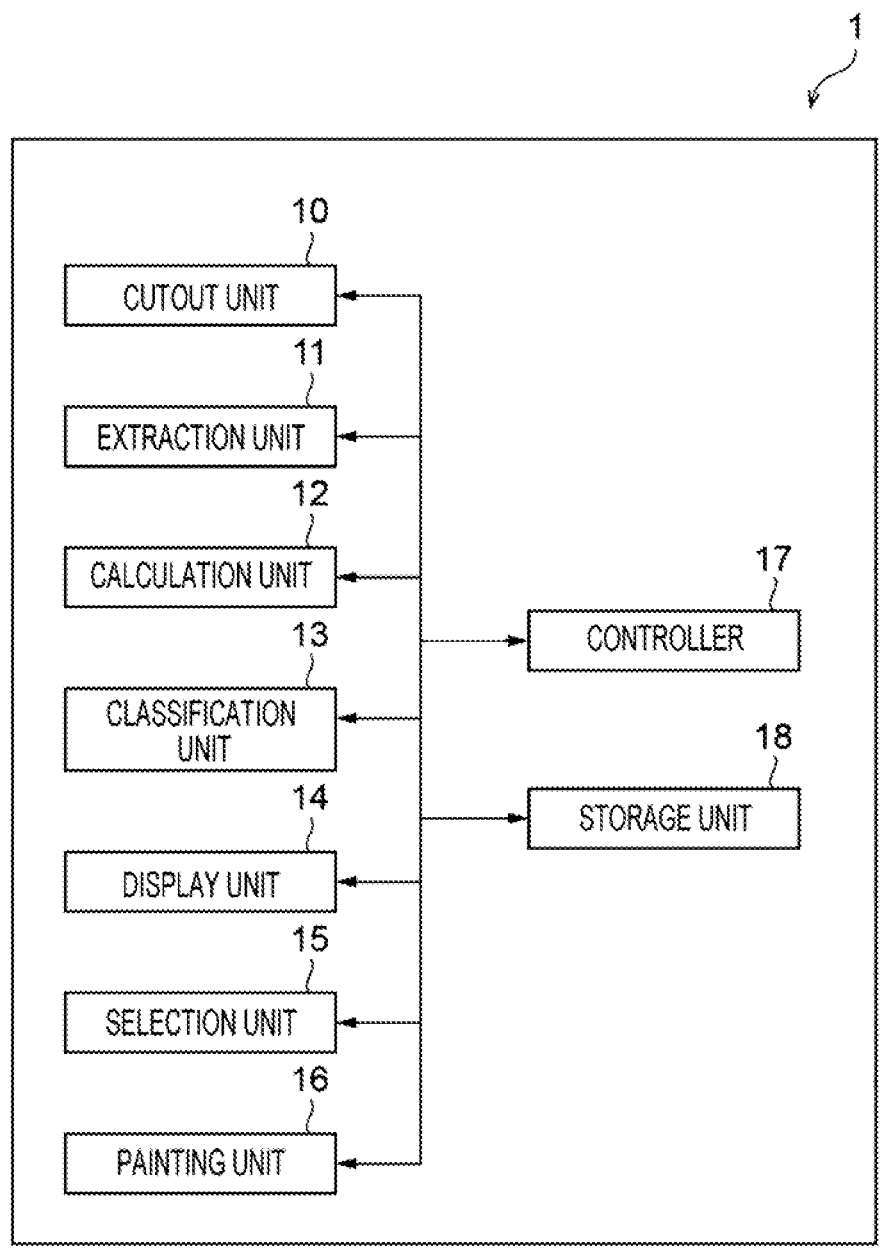
FIG. 3 is a functional block diagram of the information processing apparatus according to the exemplary embodiment.

FIG. 3 is a functional block diagram of the information processing apparatus according to the exemplary embodiment.

As illustrated in FIG. 3, the information processing apparatus 1 includes a cutout unit 10, an extraction unit 11, a calculation unit 12, a classification unit 13, a display unit 14, a selection unit 15, a painting unit 16, a controller 17, and a storage unit 18. Here, the classification unit 13 is an example of a "detector". Further, the display unit 14 is an example of a "receiver". In addition, the painting unit 16 is an example of an "image processor".

Regarding a relationship between a hardware configuration and a functional configuration in the information processing apparatus 1, the CPU 3, on the hardware, executes the program PR stored in the storage medium 5 using the memory 6 and controlling the operations of the input unit 2 and the output unit 4 as necessary, thereby implementing the functions of each of the cutout unit 10, the extraction unit 11, the calculation unit 12, the classification unit 13, the display unit 14, the selection unit 15, the painting unit 16, and the controller 17. The function of each unit will be described later.

FIGS. 4A to 4E illustrate punch hole images and pseudo punch hole images according to the exemplary embodiment.

Figure 4A:
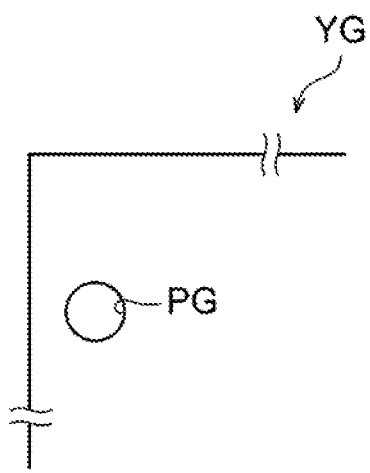
FIG. 4A illustrates a punch hole image according to the exemplary embodiment.
Figure 4B:
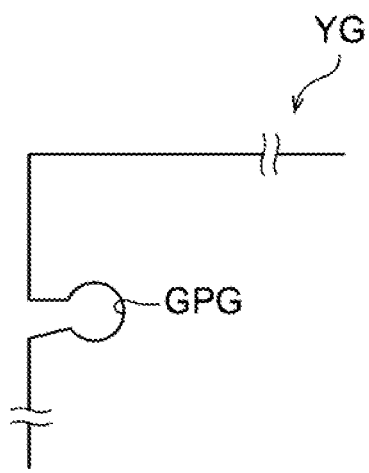
FIGS. 4B to 4E illustrate pseudo punch hole images according to the exemplary embodiment.

As illustrated in FIG. 4A, a punch hole image PG is an image that is clearly a two-hole punch hole or a loose-leaf punch hole in the read image YG of A4 paper or B5 paper.

Figure 4C:
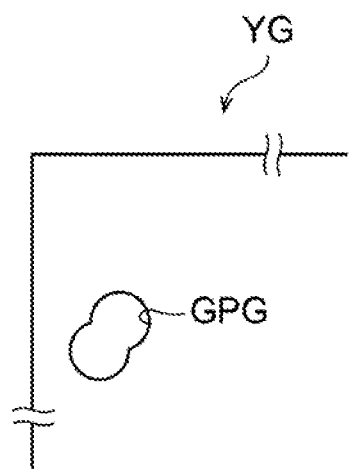

A pseudo punch hole image GPG is an image in which it is unclear that the hole is a punch hole because the hole is partially cut out in the read image YG, although it needs to be recognized as a punch hole originally (illustrated in FIG. 4B), and an image in which it is unclear that the hole is a punch hole because two holes are partially overlapped, although it needs to be recognized as a punch hole originally (illustrated in FIG. 4C).

Figure 4D:
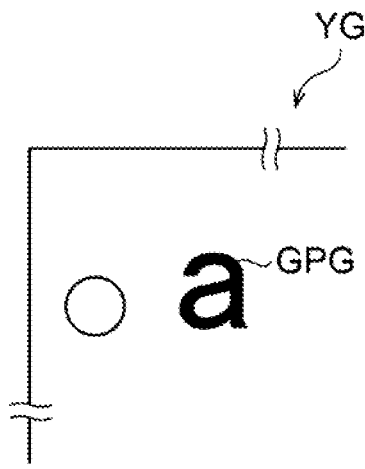
Figure 4E:
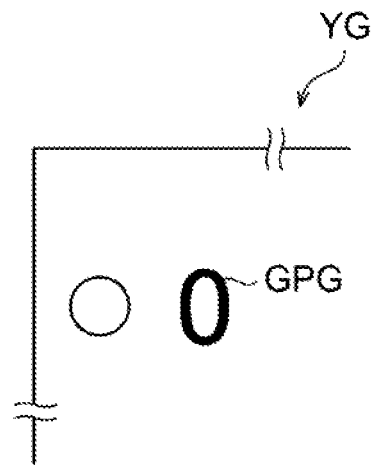

A pseudo punch hole image GPG is an image in which it is unclear that the hole is not a punch hole because the image has a character having a hole outline similar to the size of the punch hole (for example, alphabet a, numeral 0), although it needs to be recognized as not a punch hole originally (illustrated in FIGS. 4D and 4E).

<Operation of First Exemplary Embodiment>

Figure 5:
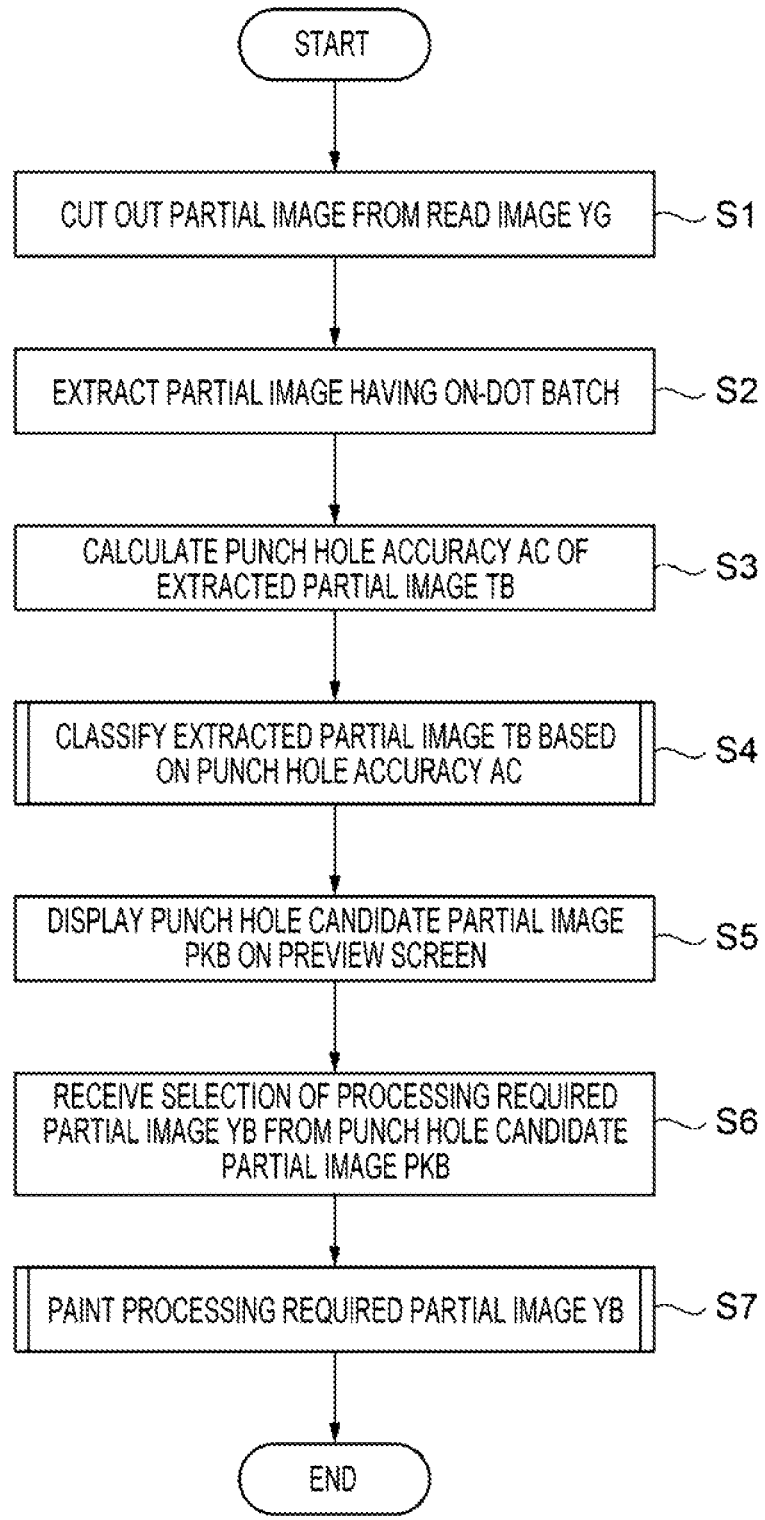
FIG. 5 is a flowchart illustrating an operation of the information processing apparatus according to the exemplary embodiment.

FIG. 5 is a flowchart illustrating an operation of the information processing apparatus according to the exemplary embodiment. Hereinafter, the operation of the information processing apparatus according to the exemplary embodiment will be described with reference to the flowchart of FIG. 5.

Figure 6:
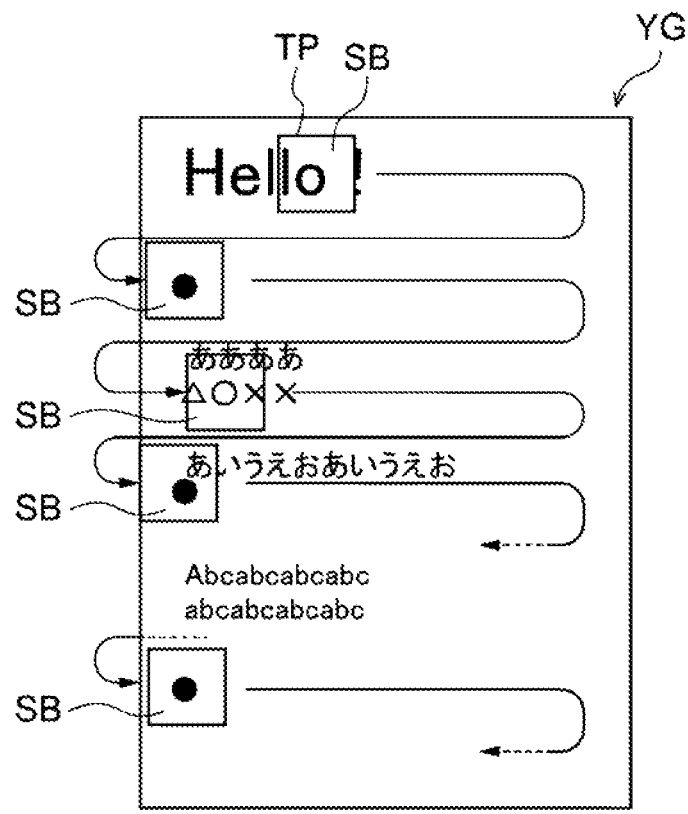
FIG. 6 illustrates an operation of cutting out a partial image according to the exemplary embodiment.

Step S1: As illustrated in FIG. 6, the CPU 3 cut outs, as the cutout unit 10, an image of a portion corresponding to a template TP (rectangle having a predetermined size) while moving the template TP in the read image YG, that is, acquires such an image, thereby generating plural acquired partial images SB.

Figure 7:
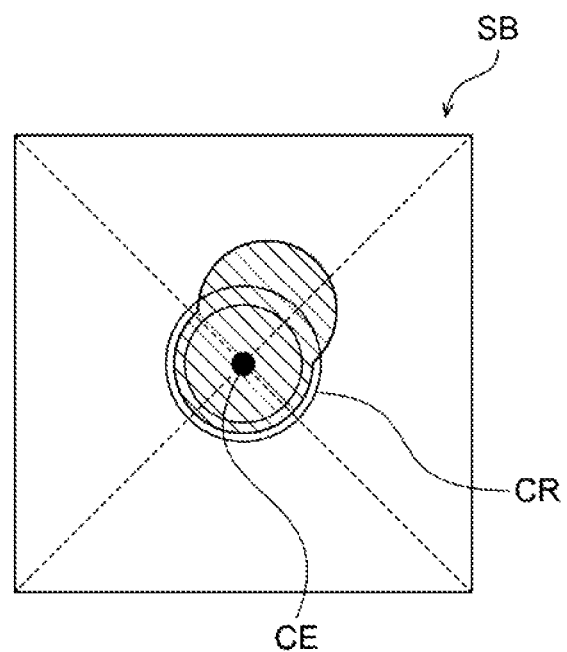
FIG. 7 illustrates an operation of extracting a partial image according to the exemplary embodiment.

Step S2: As illustrated in FIG. 7, the CPU 3 extracts, as the extraction unit 11, the acquired partial images SB in which pixels representing a punch hole shape or a shape similar to the punch hole are concentrated within a circular region CR defined by a predetermined radius (for example, the radius of the punch hole) from a center point CE of the acquired partial images SB among the plural acquired partial images SB. Hereinafter, the extracted acquired partial image is referred to as an "extracted partial image TB".

Step S3: The CPU 3 calculates, as the calculation unit 12, an accuracy indicating whether an image included in each of the plural extracted partial images TB is a punch hole image in order to estimate whether such an image is a punch hole image PG, a pseudo punch hole image GPG, or a non-punch hole image HPG (hereinafter, referred to as a "punch hole accuracy AC"). Here, the CPU 3 performs the punch hole accuracy AC of each of the plural extracted partial images TB using a known template matching of the related art or another method. The template matching is, for example, a sum of squared difference (SSD), a sum of absolute difference (SAD), or a normalized cross-correlation (NCC). Another method is, for example, a combination of an edge detection, a binarization, and a Hough transform.

Figure 8:
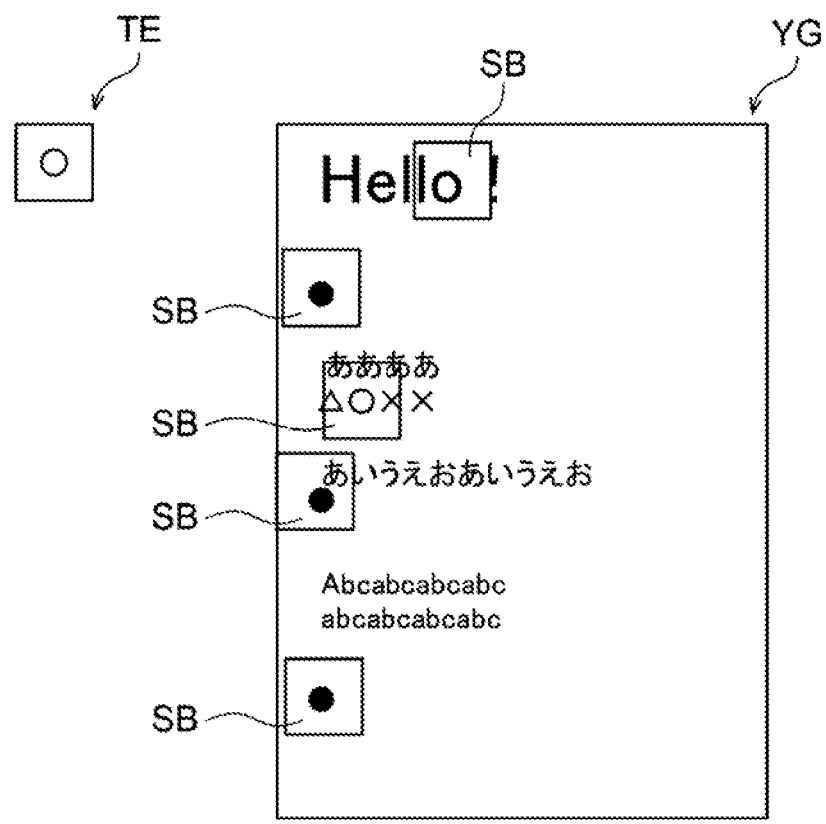
FIG. 8 illustrates template matching according to the exemplary embodiment.

FIG. 8 illustrates template matching according to the exemplary embodiment. As illustrated in FIG. 8, the CPU 3 calculates a degree of coincidence with an image that may be included in each of the plural extracted partial images TB using a template TE having the diameter size of a punch hole. Here, the image that may be included in each of the plural extracted partial images TB is any one of the punch hole image PG, the pseudo punch hole image GPG, and the non-punch hole image HPG. Further, the degree of coincidence with an image that may be included in each of the plural extracted partial images TB refers to, for example, a cumulative square error of all pixels between the template TE and the extracted partial image TB, but is not limited to this.

Instead of using two different templates such as the template TP illustrated in FIG. 6 and the template TE illustrated in FIG. 8 as described above, one template having the function of the template TP and the function of the template TE (not illustrated) may be used to perform the above-described cutout and the above-described extraction simultaneously.

Figure 9A:
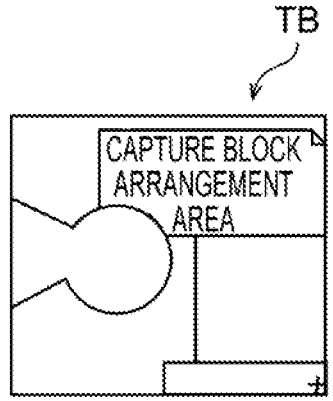
FIG. 9A illustrates an extracted partial image according to the exemplary embodiment.
Figure 9B:
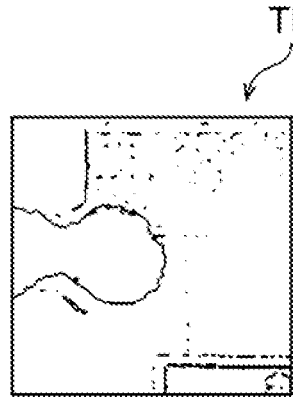
FIG. 9B illustrates an edge detection and a binarization according to the exemplary embodiment.
Figure 9C:
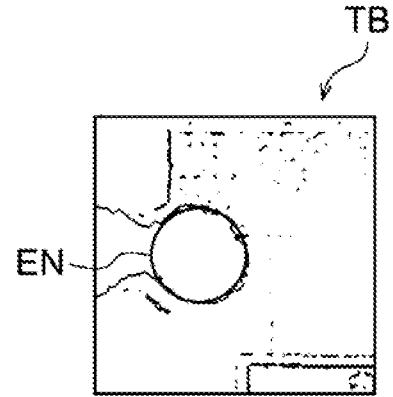
FIG. 9C illustrates a Hough transform according to the exemplary embodiment.

FIG. 9A illustrates an extracted partial image according to the exemplary embodiment, FIG. 9B illustrates an edge detection and a binarization according to the exemplary embodiment, and FIG. 9C illustrates a Hough transform according to the exemplary embodiment. For the extracted partial image TB illustrated in FIG. 9A, the CPU 3 detects the edges of the contents contained in the extracted partial image TB (characters and figures), as illustrated in FIG. 9B and performs the binarization. Next, as illustrated in FIG. 9C, after a circular shape EN is found by performing the Hough transform, the number of pixels in the found circular shape EN is counted.

Referring back to FIG. 5, the operation of the information processing apparatus will be described.

Step S4: As the classification unit 13, the CPU 3 classifies the plural extracted partial images TB into (1) a punch hole partial image PB, (2) a punch hole candidate partial image PKB, and (3) a non-punch hole partial image HPB based on the punch hole accuracy AC of the plural extracted partial images TB.

Figure 10:
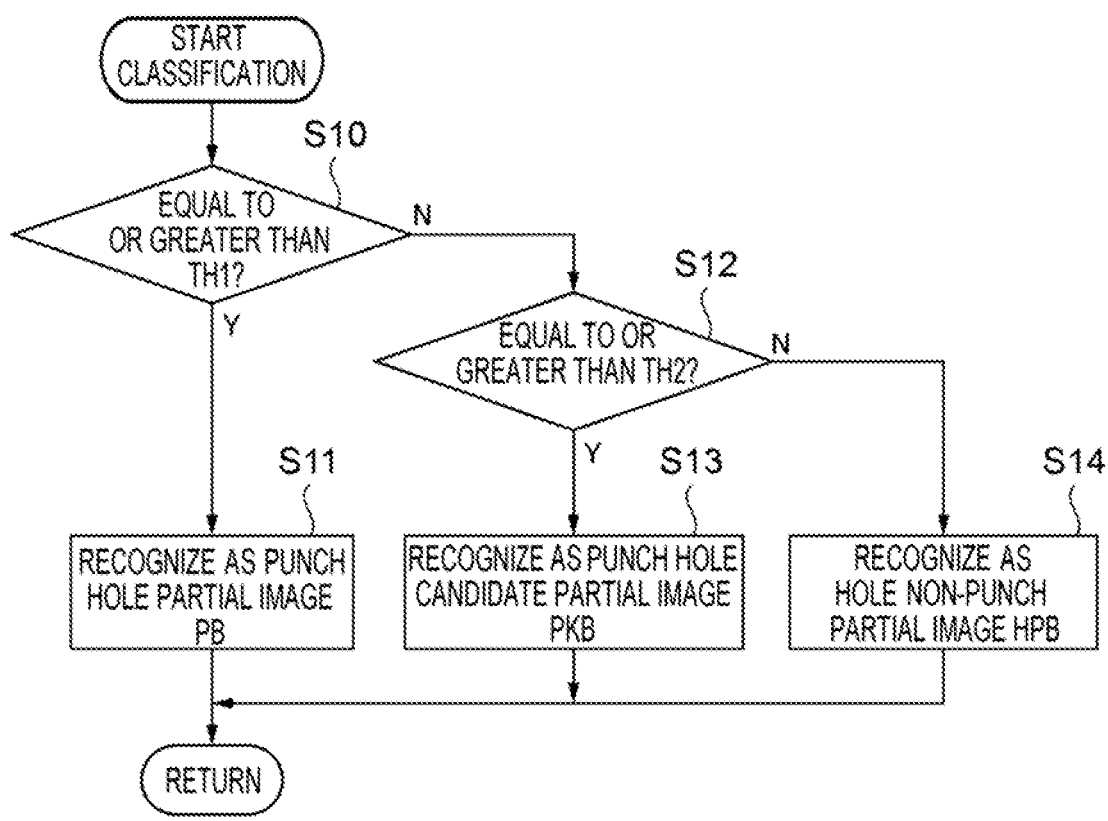
FIG. 10 is a subroutine illustrating classification of extracted partial images according to the exemplary embodiment.
Figure 11:
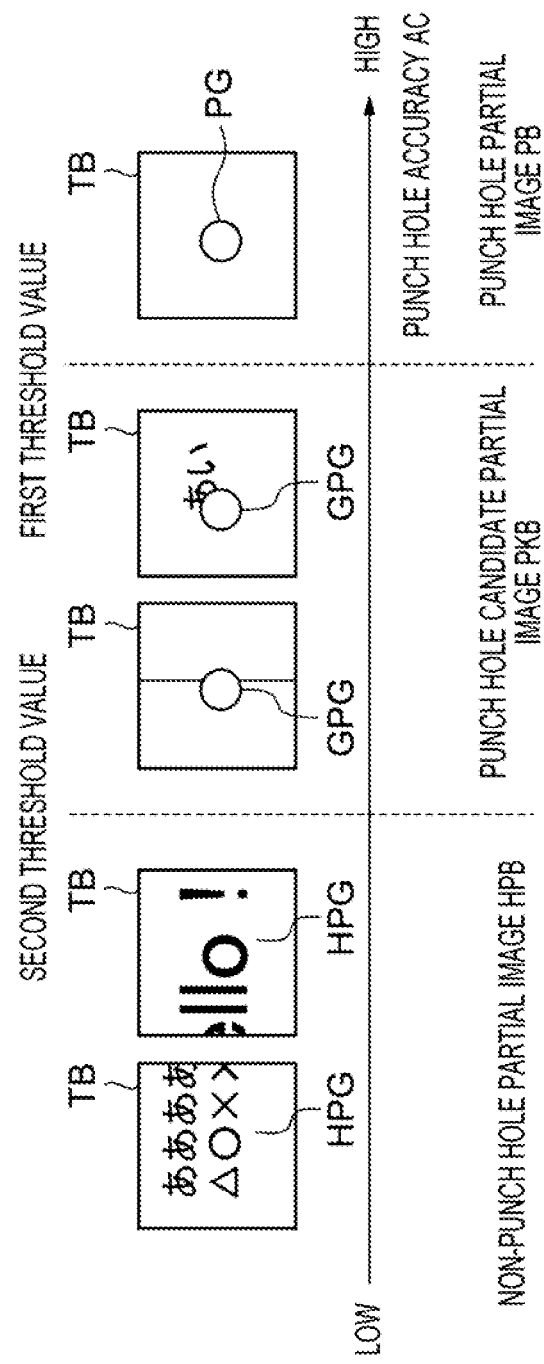
FIG. 11 illustrates a punch hole partial image, a punch hole candidate partial image, and a non-punch hole partial image according to the exemplary embodiment.

FIG. 10 is a subroutine illustrating classification of extracted partial images according to the exemplary embodiment. FIG. 11 illustrates a punch hole partial image, a punch hole candidate partial image, and a non-punch hole partial image according to the exemplary embodiment. Hereinafter, the classification of the extracted partial images will be described with reference to FIGS. 10 and 11. Further, the process of FIG. 10 is executed for each of the plural extracted partial images TB.

Step S10: The CPU 3 determines whether the punch hole accuracy AC of the extracted partial image TB is equal to or greater than the first threshold value TH1.

Step S11: When "Y (Yes)" is obtained in step S10, the CPU 3 recognizes that the extracted partial image TB is the punch hole partial image PB including the punch hole image PG illustrated in FIG. 11.

Step S12: When "N (No)" is obtained in step S10, the CPU 3 determines whether the punch hole accuracy AC of the extracted partial image TB is equal to or greater than the second threshold value TH2.

Step S13: When "Y (Yes)" is obtained in step S12, the CPU 3 recognizes that the extracted partial image TB is the punch hole candidate partial image PKB including the pseudo punch hole image GPG illustrated in FIG. 11.

Step S14: When "N (No)" is obtained in step S12, the CPU 3 recognizes that the extracted partial image TB is the non-punch hole partial image HPB including the non-punch hole image HPG illustrated in FIG. 11.

Figures 12, 13:
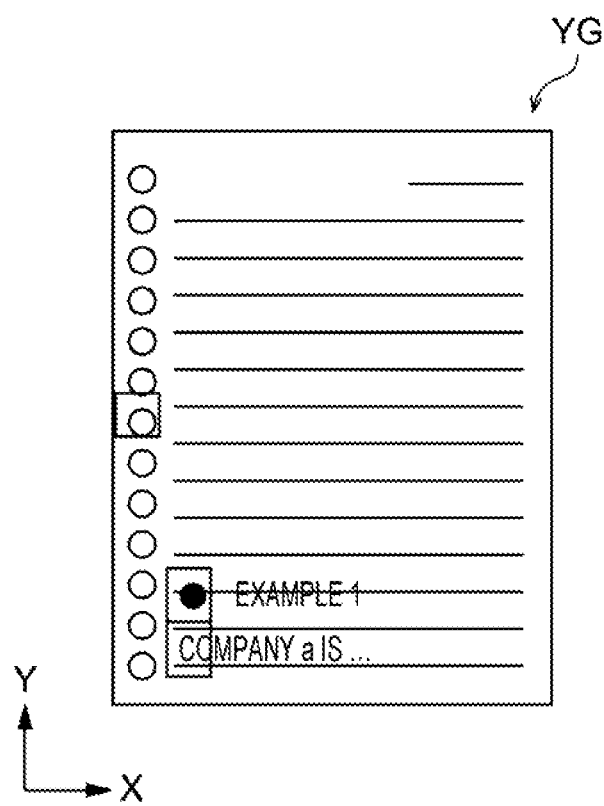
FIG. 12 illustrates a relationship among a document type, a first threshold value, and a second threshold value according to the exemplary embodiment.
FIG. 13 illustrates a read image according to the exemplary embodiment.

FIG. 12 illustrates a relationship among a document type, a first threshold value, and a second threshold value according to the exemplary embodiment.

Generally, the position, number, and interval of punch holes in a document vary depending on a type of document such as the shape and size of the document. Therefore, the first threshold value TH1 and the second threshold value TH2 used for the classification of the extracted partial image TB described above may differ depending on the type of a document. Specifically, from the viewpoint of recognizing the punch hole candidate partial image PKB in a non-standard document without omission, the first threshold value TH1 (for example, 75%) and the second threshold value TH2 (for example, 40%) for the non-standard document may be smaller than the first threshold value TH1 (for example, 90%) and the second threshold value TH2 (for example, 48%) for the standard document.

Referring back to FIG. 5, the operation of the information processing apparatus 1 will be described.

Figure 14:
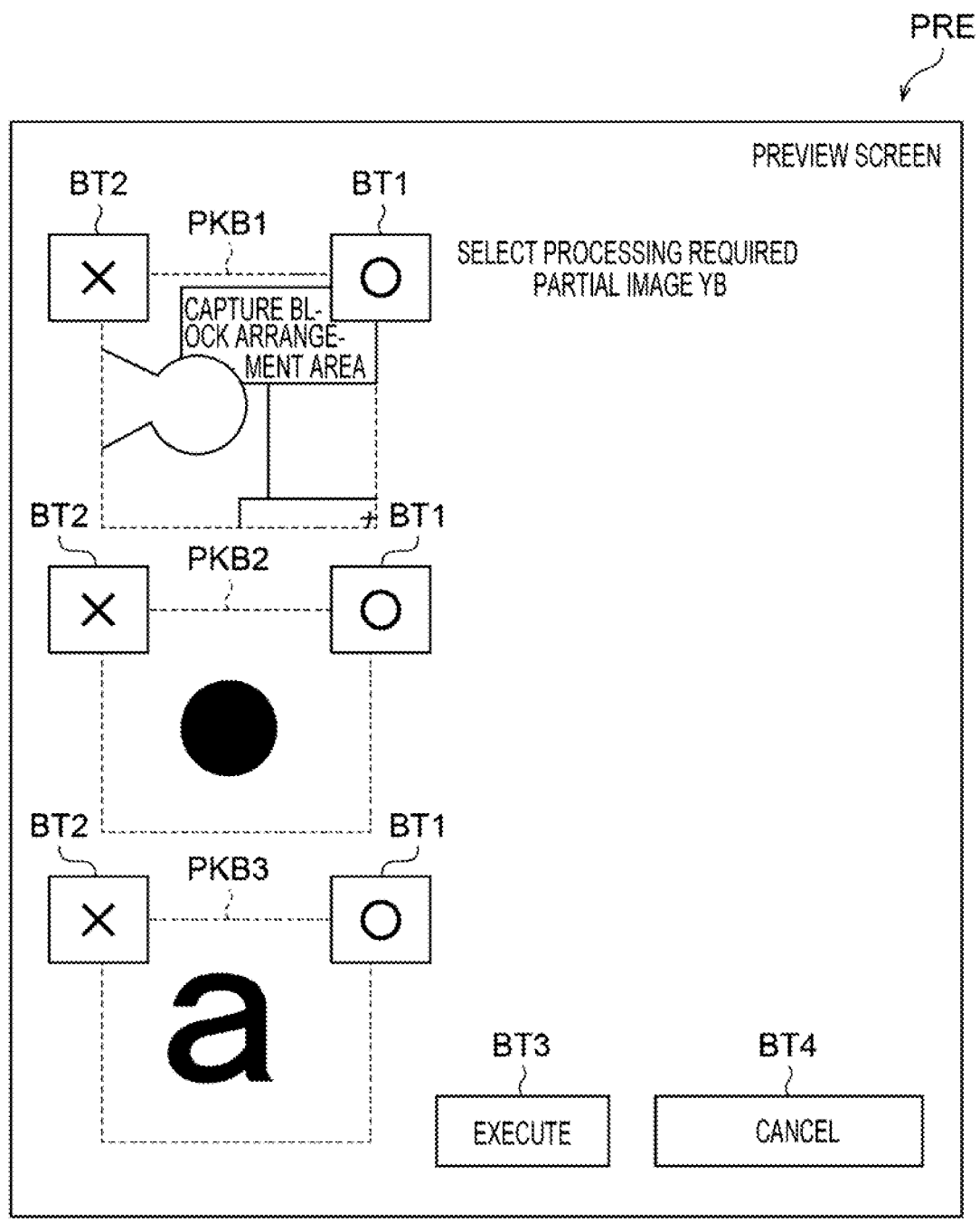
FIG. 14 illustrates a preview display of the punch hole candidate partial image according to the exemplary embodiment.

FIG. 13 illustrates a read image according to the exemplary embodiment. FIG. 14 illustrates a preview display of the punch hole candidate partial image according to the exemplary embodiment.

Step S5: The CPU 3 preview-displays, as the display unit 14 and the selection unit 15, plural punch hole candidate partial images PKB1, PKB2, and PKB3 obtained from the read image YG illustrated in FIG. 13 on a preview screen PRE of the output unit 4 as illustrated in FIG. 14.

When displaying a preview of the punch hole candidate partial images PKB1, PKB2, and PKB3, the CPU 3 displays buttons BT1, BT2, BT3, and BT4 together with the images, that is, displays the buttons in a superimposed manner. More specifically, the CPU 3 displays a "O" mark button BT1 indicating that each of the punch hole candidate partial images PKB1, PKB2, and PKB3 is "selected" separately. The CPU 3 also displays an "x" mark button BT2 indicating that the punch hole candidate partial images PKB1, PKB2, and PKB3 are "not selected (non-selected)". The CPU 3 also displays an "execute" mark button BT3 to "execute" the above-mentioned "select" or "non-select". The CPU 3 also displays a "cancel" button BT4 to "cancel" the above-mentioned "select" or "non-select". Here, the "O" mark button BT1 is an example of a "select button". Further, the "x" mark button BT2 is an example of a "non-select button".

Step S6: When plural punch hole candidate partial images PKB are displayed as previews, the user of the information processing apparatus 1 selects a processing required partial image YB on which the second image processing needs to be performed as the user considers among the plural punch hole candidate partial images PKB. The CPU 3 receives a user's selection as the selection unit 15.

It is assumed that, for example, the user of the information processing apparatus 1 wishes to (1) "select" the punch hole candidate partial image PKB1 as the processing required partial image YB, (2) "not select" the punch hole candidate partial image PKB2 as the processing required partial image YB, and (3) "not select" the punch hole candidate partial image PKB3 as the processing required partial image YB. At this time, the user (1) clicks the "O" mark button BT1 of the punch hole candidate partial image PKB1, (2) clicks the "x" mark button BT2 of the punch hole candidate partial image PKB2, and (3) clicks the "execute" button B3 after clicking the "x" mark button BT2 of the punch hole candidate partial image PKB3. In response to the click operation, the CPU 3 stores only the punch hole candidate partial image TB1 in the storage medium 5 as the processing required partial image YB.

Figure 15:
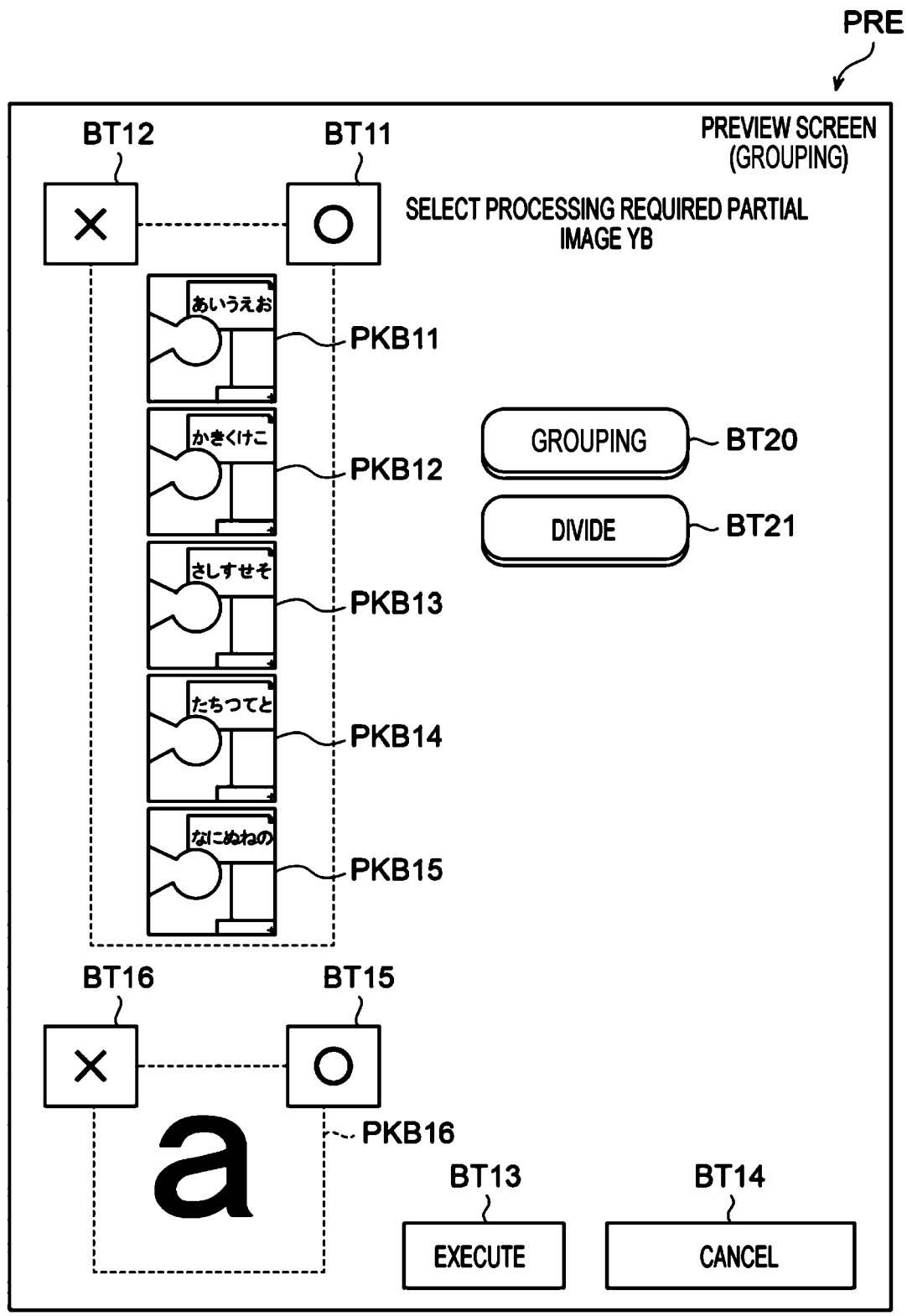
FIG. 15 illustrates a preview display (grouping) of the punch hole candidate partial image according to the exemplary embodiment.

FIG. 15 illustrates a preview display (grouping) of the punch hole candidate partial image according to the exemplary embodiment.

When the number of the punch hole candidate partial images PKB is large, instead of displaying a preview of the punch hole candidate partial images PKB1 to PKB3 separately and independently as illustrated in FIG. 14, the CPU 3 may separate the plural punch hole candidate partial images PKB11 to PKB15 from the punch hole candidate partial image PKB16 which is different from the punch hole candidate partial images PKB11 to PKB15 to group the punch hole candidate partial images PKB11 to PKB15 and display the grouped punch hole candidate partial images PKB11 to PKB15 on the preview screen PRE as illustrated in FIG. 15. This improves the workability of "select" and "non-select" described above. Further, when performing a preview display with grouping, the CPU 3 may reduce the plural punch hole candidate partial images PKB11 to PKB15, reduce the punch hole candidate partial images PKB11 to PKB15 as compared with the punch hole candidate partial images PKB1 to PKB3 illustrated in FIG. 14, and display a preview thereof. As a result, a larger number of punch hole candidate partial images PKB may be preview-displayed on the preview screen PRE, that is, the visibility is improved and the workability of "select" and "non-select" described above is further improved.

Here, the CPU 3 performs the above grouping based on the features of the punch hole candidate partial image PKB, for example, at least one of an X coordinate on an X coordinate axis (illustrated in FIG. 13), a Y coordinate on a Y coordinate axis that intersects the X coordinate axis (illustrated in FIG. 13), or the area of the pseudo punch hole image GPG (illustrated in FIG. 11). Further, in the above-described preview display with grouping, the CPU 3 may displays plural punch hole candidate partial images PKB11 to PKB15 to be smaller than one punch hole candidate partial image PKB16, in order to effectively use a display area of the preview screen PRE.

It is assumed that when the punch hole candidate partial images PKB11 to PKB15 are preview-displayed in a grouped state, the user of the information processing apparatus 1 wishes to (1) collectively "select" all of the punch hole candidate partial images PKB11 to PKB15 and (2) "not select" the punch hole candidate partial image PKB16. At this time, the user clicks the "execute" button BT13 after clicking the "O" mark button BT11 for collectively selecting all of the punch hole candidate partial images PKB11 to PKB15 and the "x" mark button BT16 for not selecting the punch hole candidate partial image PKB16. In response to the user's click operation, the CPU 3 collectively stores the punch hole candidate partial images PKB11 to PKB15 in the storage medium 5 as the processing required partial images YB. In FIG. 15, the "O" mark button BT11 is an example of the "select button" for collectively selecting all, and the "x" mark button BT12 is an example of the "non-select button" for not collectively selecting all.

Figure 16:
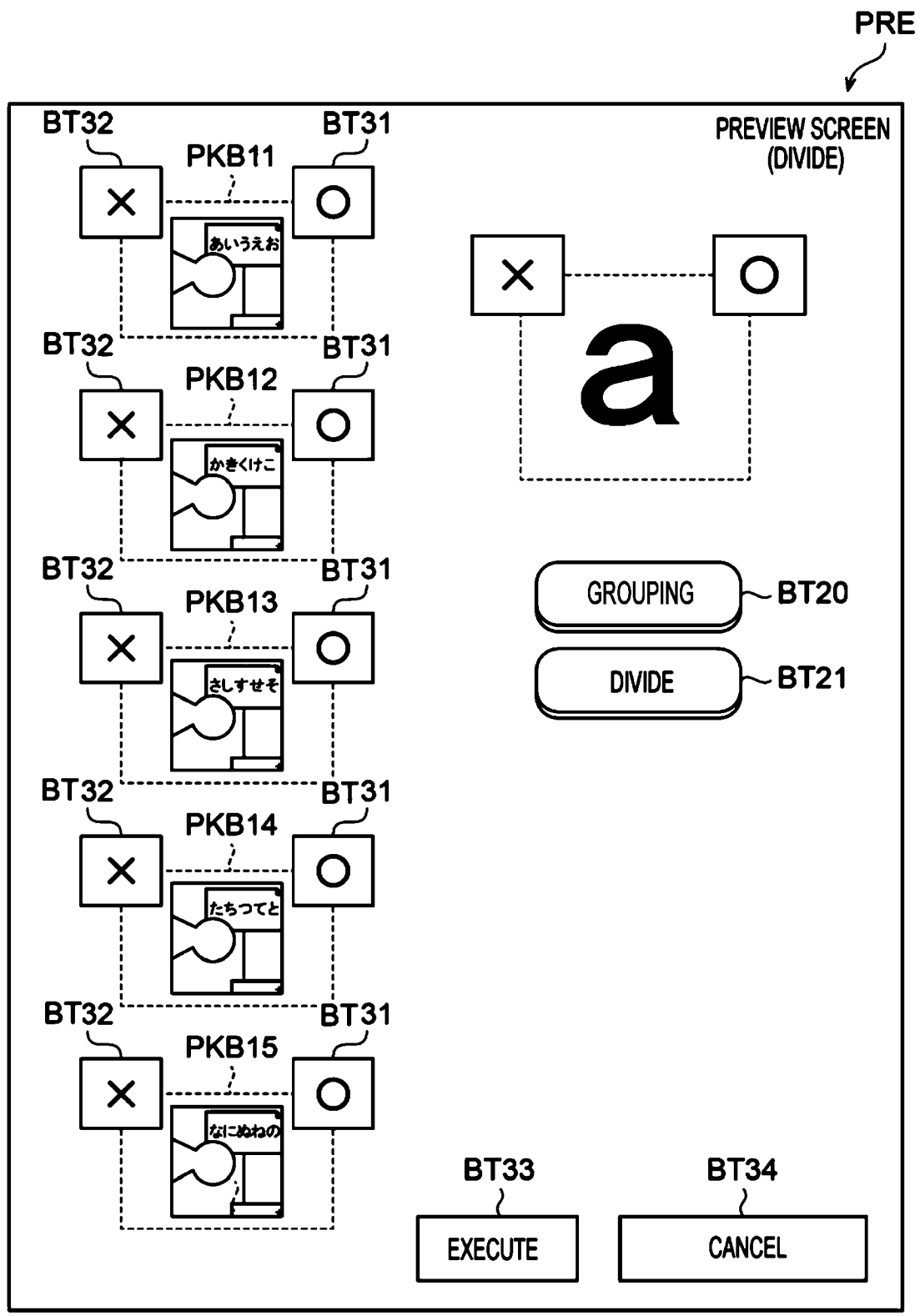
FIG. 16 illustrates a preview display (divide) of the punch hole candidate partial image according to the exemplary embodiment.

FIG. 16 illustrates a preview display (divide) of the punch hole candidate partial image according to the exemplary embodiment.

As illustrated in FIGS. 15 and 16, the preview screen PRE is provided with a "grouping" button BT20 and a "divide" button BT21. For example, when feeling that the work of "select" and "non-select" is troublesome in the preview display of "grouping" illustrated in FIG. 15, the user of the information processing apparatus 1 clicks the "divide" button BT21 in order to cancel the "grouping". In response to the click operation, the CPU 3 performs a preview display by the "division" on the punch hole candidate partial images PKB11 to PKB15, as illustrated in FIG. 16, instead of the preview display by the "grouping" illustrated in FIG. 15. Here, "divide" means that grouping is canceled.

It is assumed, for example, that the user of the information processing apparatus 1 wishes to (1) "select" the punch hole candidate partial images PKB11, PKB13, and PKB14, and (2) "not select" the punch hole candidate partial images PKB12 and PKB15. At this time, the user clicks the "execute" button BT33 after clicking the "O" mark button BT31 of each of the punch hole candidate partial images PKB11, PKB13, and PKB14, and clicking the "x" mark button BT32 of each of the punch hole candidate partial images PKB12 and PKB15. In response to the user's operation, the CPU 3 stores the punch hole candidate partial images PKB11, PKB13, and PKB14 in the storage medium 5 as the processing required partial images YB.

For example, when feeling that the work of "select" and "non-select" is troublesome in the preview display of "divide" illustrated in FIG. 16, the user of the information processing apparatus 1 clicks the "grouping" button BT20 in order to cancel the "divide". In response to the click operation, the CPU 3 displays again a preview of "grouping" illustrated in FIG. 15 for the punch hole candidate partial images PKB11 to PKB16.

Figure 17:
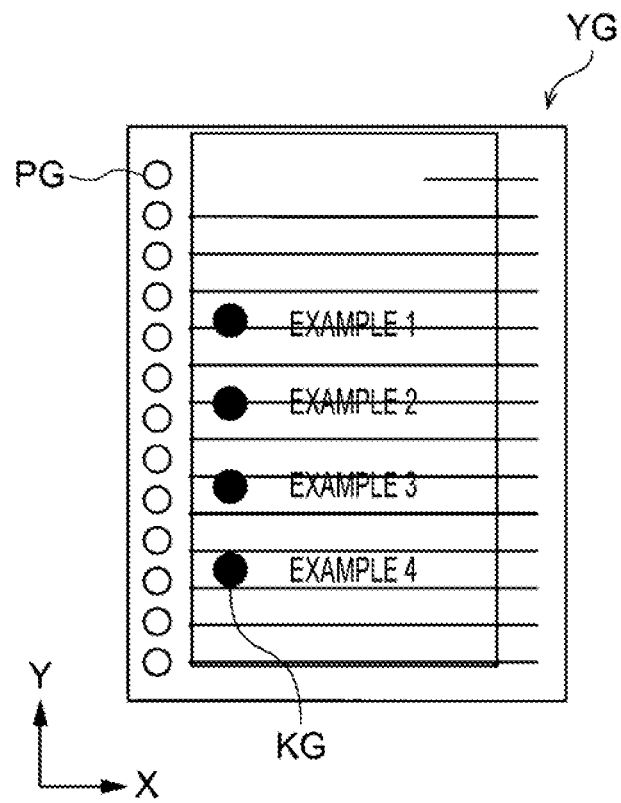
FIG. 17 illustrates another read image according to the exemplary embodiment.
Figure 18A:
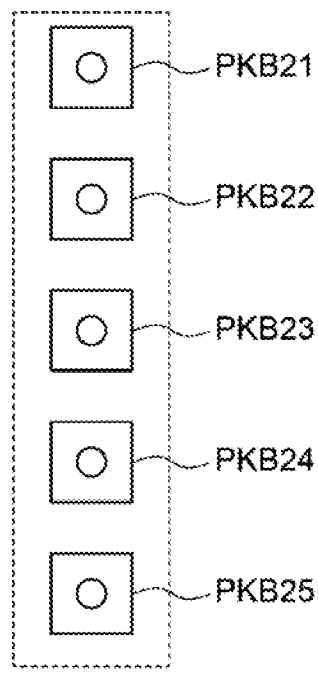
FIG. 18A illustrates a punch hole candidate partial image of one grouped group according to the exemplary embodiment.
Figure 18B:
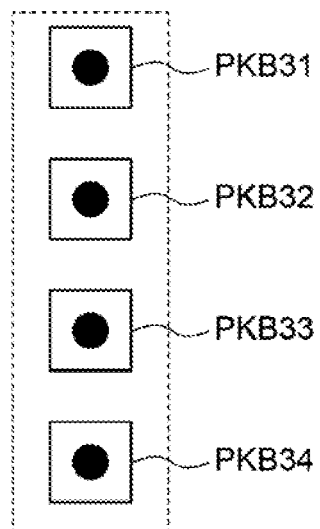
FIG. 18B illustrates a punch hole candidate partial image of another grouped group according to the exemplary embodiment.

FIG. 17 illustrates another read image according to the exemplary embodiment. FIG. 18A illustrates a punch hole candidate partial image of one grouped group according to the exemplary embodiment, and FIG. 18B illustrates a punch hole candidate partial image of another grouped group according to the exemplary embodiment.

As illustrated in FIG. 17, when the read image YG includes plural punch hole images PG (however, the images may be recognized as pseudo punch hole images GPG) having the same X coordinate in which, for example, X=X1 (not illustrated), and black circle images KB that are plural black circles "●" (for example, middle dot used in bulleted list) having the same X coordinate in which, for example, X=X2 (not illustrated), the CPU 3 may perform the above "grouping" on the punch hole candidate partial images PKB21 to PKB25 (illustrated in FIG. 18A) including the punch hole image PG, and the punch hole candidate partial images PKG31 to PKG34 (illustrated in FIG. 18B) including the black circle image KG based on the X coordinates of the punch hole candidate partial images PKB21 to PKB25 and PKB31 to PKB34. Thus, as illustrated in FIGS. 18A and 18B, the CPU 3 separates the former punch hole candidate partial images PKB21 to PKB25 having a high possibility of being punch holes and the latter punch hole candidate partial images PKB31 to PKB34 having a high possibility of not being punch holes from each other, and displays a preview thereof on the preview screen PRE (for example, illustrated in FIG. 15). As a result, the work of "select" and "non-select" by the user of the information processing apparatus 1 is further reduced.

Referring back to FIG. 5, the operation of the information processing apparatus 1 will be described.

Step S7: The CPU 3 performs, as the painting unit 16, image processing on the plural punch hole partial images PB and the processing required partial images YB stored in the storage medium 5.

Figure 19:
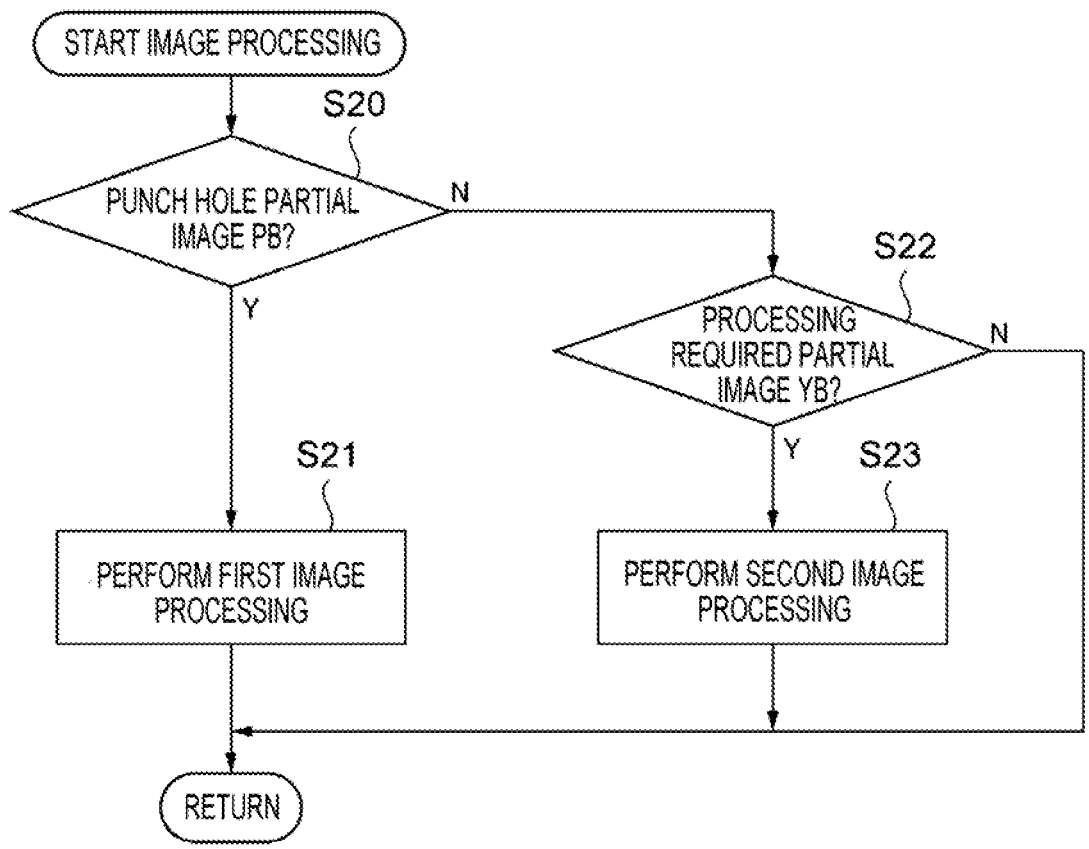
FIG. 19 is a subroutine illustrating image processing according to the exemplary embodiment.
Figure 20A:
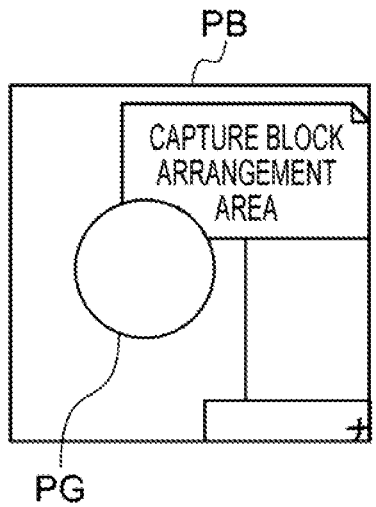
FIG. 20A illustrates the punch hole partial image according to the exemplary embodiment.
Figure 20B:
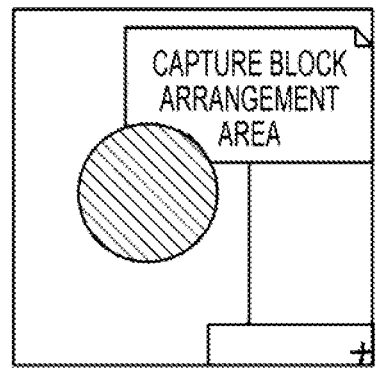
FIG. 20B illustrates first image processing performed on the punch hole partial image according to the exemplary embodiment.
Figure 21A:
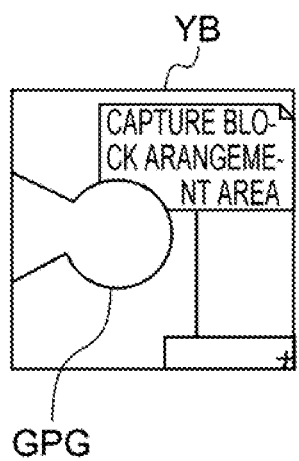
FIG. 21A illustrates a processing required partial image according to the exemplary embodiment.
Figure 21B:
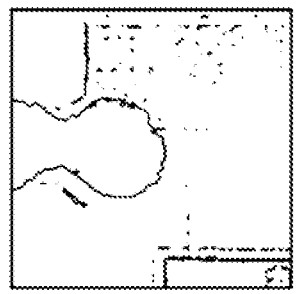
FIG. 21B illustrates an edge detection of the processing required partial image according to the exemplary embodiment.
Figure 21C:
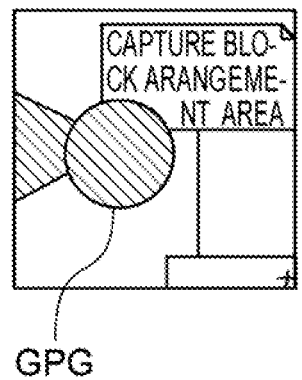
FIG. 21C illustrates second image processing performed on the processing required partial image according to the exemplary embodiment.

FIG. 19 is a subroutine illustrating image processing according to the exemplary embodiment. FIG. 20A illustrates the punch hole partial image according to the exemplary embodiment, and FIG. 20B illustrates first image processing performed on the punch hole partial image according to the exemplary embodiment. FIG. 21A illustrates a processing required partial image according to the exemplary embodiment, FIG. 21B illustrates an edge detection of the processing required partial image according to the exemplary embodiment, and FIG. 21C illustrates second image processing performed on the processing required partial image according to the exemplary embodiment. In addition, the process of FIGS. 21A to 21C is executed for each of the plural punch hole partial images PB and the plural processing required partial images YB, which are images to be subjected to image processing.

Step S20: The CPU 3 determines whether the image to be subjected to image processing stored in the storage medium 5 is the punch hole partial image PB.

Step S21: When it is determined in step S20 that the above-described image is a punch hole partial image PB, the CPU 3 performs the first image processing on the image. That is, for the punch hole partial image PB illustrated in FIG. 20A, the CPU 3 paints the pixels in the circle of the punch hole image PG illustrated in FIG. 20B with a color that represents the entire punch hole partial image PB, that is, removes the punch hole image PG.

Step S22: When it is determined in step S20 that the image is not the punch hole partial image PB, the CPU 3 determines whether the image is a processing required partial image YB.

Step S23: When it is determined in step S22 that the image is a processing required partial image YB, the CPU 3 performs the second image processing on the image. More specifically, for example, the CPU 3 detects the edge of the image contents (characters and figures) as illustrated in FIG. 21B from the processing required partial image YB including a notched pseudo punch hole image GPG that is included in the processing required partial image YB and illustrated in FIGS. 4B and 21A, and paints the pixels in the pseudo punch hole image GPG having a shape specified by the detected edge (a shape more complicated than a normal punch hole shape such as a key hole) with a color that represents or symbolizes the entire processing required partial image YB as illustrated in FIG. 21C, that is, removes the pseudo punch hole image GPG.

As described above, in the information processing apparatus 1 according to the exemplary embodiment, the CPU 3 serving as the classification unit 13 classifies the partial image obtained from the read image YG into the punch hole partial image PB, the punch hole candidate partial image PKB, or the non-punch hole partial images HPB using the first threshold value TH1 and the second threshold value TH2. The CPU 3 also displays, as the display unit 14, a preview of the punch hole candidate partial image PKB on the preview screen PRE. The CPU 3 continues to receive, as the selection unit 15, the processing required partial image YB selected by the user among the punch hole candidate partial images PKB. Further, the CPU 3 performs, as the painting unit 16, the second image processing on the processing required partial image YB. Thus, the pseudo punch hole image GPG included in the processing required partial image YB is removed.

Further, in the above-described exemplary embodiments, the processor refers to a processor in a broad sense, and includes a general-purpose processor (for example, CPU: Central Processing Unit) or a dedicated processor (for example, GPU: Graphics Processing Unit, ASIC: Application Specific Integrated Circuit, FPGA: Field Programmable Gate Array, and a programmable logic device).

In addition, the operation of a processor in each of the above exemplary embodiments may be performed not only by a single processor but also by cooperation of plural processors existing at physically separated positions. Further, the order of operations of the processor is not limited to the order described in the above exemplary embodiments, and may be changed as appropriate.

Further, in each of the above exemplary embodiments, descriptions have been made on a mode in which the information processing program PR is stored (installed) in the storage medium 5 in advance, but the present disclosure is not limited to this. The program may be provided in a format of being recorded on a recording medium such as a compact disc read only memory (CD-ROM), a digital versatile disc read only memory (DVD-ROM), or a universal serial bus (USB) memory. Further, the program may be downloaded from an external device via a network.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
   a detector configured to detect a punch hole candidate partial image from a plurality of partial images constituting a read image of a document, wherein the punch hole candidate partial image has a punch hole accuracy indicating whether the punch hole candidate partial image is a punch hole image, and the punch hole accuracy is a value less than a first threshold and equal to or greater than a second threshold smaller than the first threshold, wherein the first threshold and the second threshold differ depending on a type of the read image;
   a receiver configured to
      display the punch hole candidate partial image, and
      receive an instruction from a user to perform image processing on the punch hole candidate partial image; and
   an image processor configured to perform the image processing on the punch hole candidate partial image when the receiver receives the instruction.

2. The information processing apparatus according to claim 1, wherein
   the detector detects a punch hole partial image having the punch hole accuracy is equal to or greater than the first threshold, from the plurality of partial images, and
   the image processor
      performs first image processing of removing the punch hole image included in the punch hole partial image, on the punch hole partial image, and
      performs second image processing of removing a pseudo punch hole image included in a processing required partial image that is the punch hole candidate partial image for which the instruction is received from the user.

3. The information processing apparatus according to claim 2, wherein the first image processing comprises painting the punch hole image with a color representative of the punch hole partial image.

4. The information processing apparatus according to claim 2, wherein
   the second image processing comprises
      performing an edge detection on the processing required partial image, and
      painting the pseudo punch hole image defined by the detected edge with a color representative of the processing required partial image.

5. The information processing apparatus according to claim 1, wherein the receiver groups a plurality of the punch hole candidate partial images based on features of the punch hole candidate partial images and displays the punch hole candidate partial images.

6. The information processing apparatus according to claim 5, wherein
   the features of the punch hole candidate partial images comprise at least one of
      (i) first coordinates of the punch hole candidate partial images in a first coordinate axis in the read image,
      (ii) second coordinates of the punch hole candidate partial images in a second coordinate axis that intersects the first coordinate axis, or
      (iii) an area of a pseudo punch hole image.

7. The information processing apparatus according to claim 5, wherein the receiver reduces and displays the punch hole candidate partial images.

8. The information processing apparatus according to claim 5, wherein the receiver performs dividing by cancellation of the grouping of the punch hole candidate partial images and displays the divided punch hole candidate partial images.

9. The information processing apparatus according to claim 5, wherein
   the receiver displays
      a select button for collectively giving an instruction to perform the image processing on the grouped punch hole candidate partial images, and
      a non-select button for collectively not giving an instruction to perform the image processing on the grouped punch hole candidate partial images.

10. The information processing apparatus according to claim 1, wherein the receiver displays a non-select button for not giving the instruction to perform the image processing on the punch hole candidate partial image.

11. The information processing apparatus according to claim 1, wherein the receiver displays a select button for giving the instruction to perform the image processing on the punch hole candidate partial image.

12. The information processing apparatus according to claim 1, wherein
    the first threshold and the second threshold, when the read image is a non-standard document other than a standard document having a predetermined position of the punch hole image, are smaller than when the read image is the standard document, respectively.

13. A non-transitory computer readable medium storing a program that causes a computer to execute information processing, the information processing comprising:
    detecting a punch hole candidate partial image from a plurality of partial images constituting a read image of a document, wherein the punch hole candidate partial image has a punch hole accuracy indicating whether the punch hole candidate partial image is a punch hole image, and the punch hole accuracy is a value less than a first threshold and equal to or greater than a second threshold smaller than the first threshold, wherein the first threshold and the second threshold differ depending on a type of the read image;
    displaying the punch hole candidate partial image;
    receiving an instruction from a user to perform image processing on the punch hole candidate partial image; and performing the image processing on the punch hole candidate partial image when receiving, from the user, the instruction.

14. An information processing apparatus comprising:

means for detecting a punch hole candidate partial image from a plurality of partial images constituting a read image of a document, wherein the punch hole candidate partial image has a punch hole accuracy indicating whether the punch hole candidate partial image is a punch hole image, and the punch hole accuracy is a value less than a first threshold and equal to or greater than a second threshold smaller than the first threshold, wherein the first threshold and the second threshold differ depending on a type of the read image;

means for displaying the punch hole candidate partial image, and receiving an instruction from a user to perform image processing on the punch hole candidate partial image; and means for performing the image processing on the punch hole candidate partial image when the instruction is received.

\* \* \* \* \*